(No Model.)
J. STEWART.
SPEED GEARING.
No. 252,537. Patented Jan. 17, 1882.
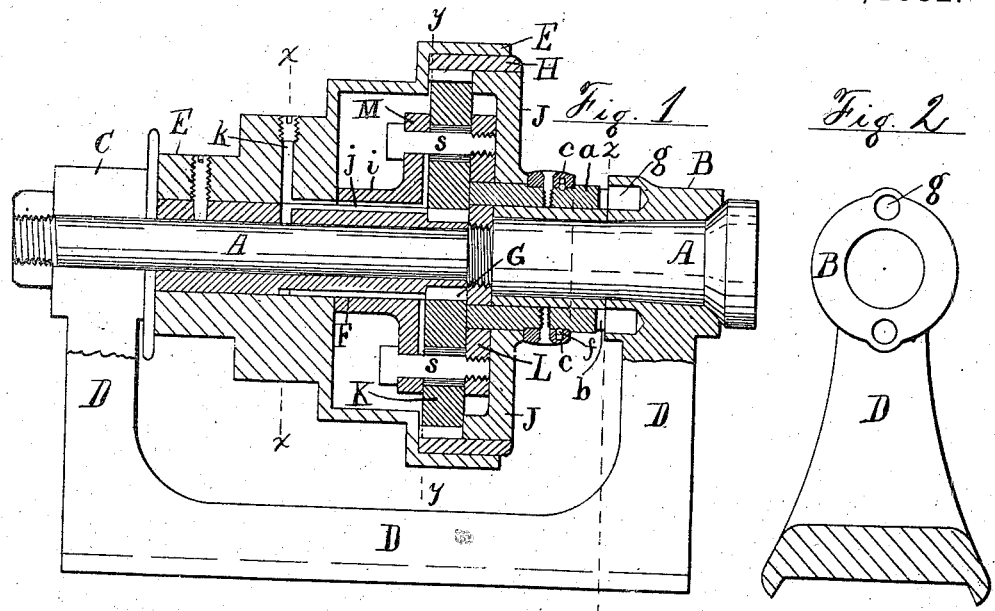
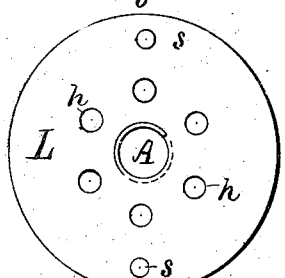
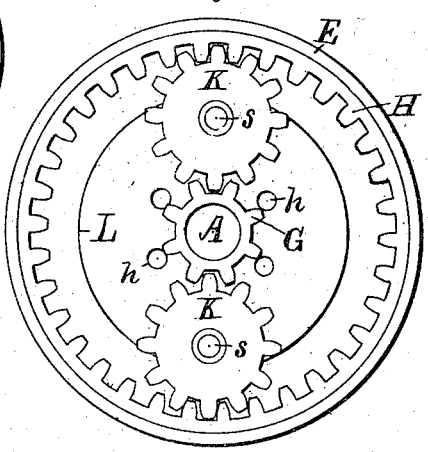
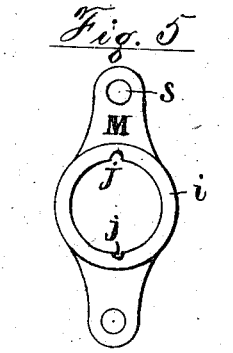
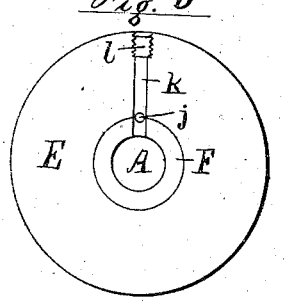
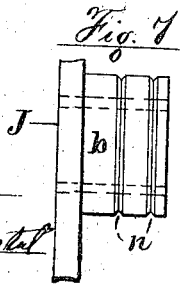
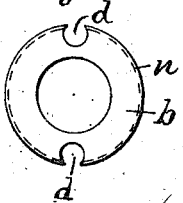
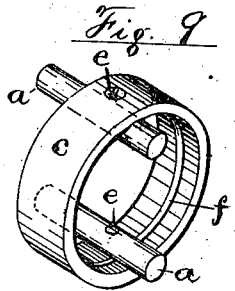
Attest:
W. C. Bristol
S. P. Steadman
Inventor
John Stewart
By Horace Harris Atty

UNITED STATES PATENT OFFICE.

JOHN STEWART, OF NEWARK, NEW JERSEY.

SPEED-GEARING.

SPECIFICATION forming part of Letters Patent No. 252,537, dated January 17, 1882.

Application filed December 2, 1881. (No model.)

*To all whom it may concern:*

Be it known that I, JOHN STEWART, residing in the city of Newark, in the county of Essex and State of New Jersey, have invented certain new and useful Improvements in Speed-Gearing, as fully described and represented in the following specification and the accompanying drawings, forming a part of the same.

My invention relates to an improvement in speed-gearing; and it consists in the construction herein shown and described for changing the speed of a shaft or spindle by means of a combination of internal gearing with a pulley or belt cone.

In the drawings annexed, Figure 1 is a side view of a lathe head and cone, chiefly in section, on the center line. Fig. 2 is a view of the inside of the front bearing of the head; Fig. 6, a section of the cone at line $x\,x$ in Fig. 1; Fig. 4, a section of the cone at the rear edge of the gearing on line $y\,y$ in Fig. 1. Fig. 5 is a view of the rear side of the brace M. Fig. 3 is a front view of the locking-flange L; Figs. 7 and 8, an edge and front view of the hub on the disk of the ring-gear H, the disk being shown only in part; and Fig. 9 is a perspective view of the locking collar and bolts.

My invention is shown applied to the spindle of a lathe because of the frequent change of speed required in that tool, but is equally applicable to milling-machines and other tools, and may be combined with a single-face pulley as readily as with a cone of several steps, as the working parts are entirely disconnected from the outer side of the pulley, where the belt or other power is applied. For this reason my improved speed-gearing is equally adapted to the interior of any driving or cog wheel in a train of mechanism where the speed of the shaft needs to be changed from time to time in a definite degree. The shaft requires to be mounted in fixed bearings, at least at some point near the speed-gearing, and the entire mechanism revolves with the shaft when adjusted for the quickest rate of speed.

Attached to the shaft is a flange, to which the motion of the pulley is transmitted by an arrangement of cog-wheels disposed to avoid all side strain upon the shaft or its bearings. This desirable effect is secured as follows:

A is the shaft, revolving in bearings B and C in the head D.

E is the cone, fitted to turn loosely upon the shaft when desired, and provided with a central bush or sleeve, F, provided at its front end with a cog-wheel, G, which always rotates with the cone and sleeve at the uniform speed imparted by belt or other means.

H is an internal ring-gear, fitted to turn at pleasure inside the rim of the pulley E over the gear G, and secured to the margin of a disk, J, which is fitted to turn freely upon the shaft near the fixed bearing B.

Two intermediate gears, K, are mounted upon studs $s$, fixed upon opposite sides of the shaft in a flange, L, which is shown secured to the shaft between the gear G and disk J. The intermediates form a connection at opposite points between the central driving-pinion, G, and the ring-gear H, and thus transmit a perfectly-balanced movement to the flange and spindle in the following manner:

By a suitable locking device the disk J and the ring-gear H can be held stationary by securing them to the fixed bearing B, or be arranged to rotate with the shaft A by locking them to the flange L. When held stationary the teeth of the ring-gear serve as a fulcrum for the force and movement of the gear G, and the cog-wheels K act as levers of the first order to rotate the flange upon which they are mounted slowly inside the stationary ring H. When locked to the flange L the disk and ring-gear are compelled to rotate with the cone, as the gears K are secured by the action of the lock in a fixed relation inside the ring-gear H, and are prevented from revolving at all. The central gear is thus also prevented from turning upon the shaft, and drives the flange and shaft around as if secured directly to it.

The locking device consists of two sliding bolts, $a$, inserted longitudinally through a hub, $b$, formed on the disk J, and a collar, $c$, secured to each of the bolts and arranged to slide lengthwise of the hub. The holes $d$, through which the bolts are inserted, extend to the periphery of the hub, so that the bolts are in contact with the collar, and screws $e$ are passed through the collar into the bolts, as shown in Figs. 1 and 9. The bolts are made longer than the entire distance through the disk and hub b, so that they project into holes g, formed in the body of the stationary bearing B, when locking the disk to the latter, or into holes h h, formed in the flange L, when securing the disk to the flange. The movement of the bolts into either position is effected by sliding the collar c lengthwise upon the hub, and to retain it in either position upon the hub the latter is formed with two grooves, n, adapted to engage a spring-wire, f, (shown inserted in an annular groove inside the collar in Figs. 1 and 9.) When the bolts are pushed into the holes g to hold the disk stationary the hub b and collar c are likewise held fast, and the hand of the operator can be applied to the collar to move it while the cone is revolving and the shaft is slowly rotating by the internal gearing. By then pushing the collar toward the disk the bolts a are withdrawn from the holes g and inserted into the holes h in the flange, which is provided with six of such holes, that very little delay may ensue in engaging them as they revolve. The speed of the shaft is then immediately changed to that of the cone, and the disk and collar rotate at the same speed as the pulley E.

To brace the gears K effectually, as well as to secure a distribution of oil to their axles, the studs s are projected beyond the sides of the gears and secured in a brace, M, which revolves loosely upon the end of the sleeve F behind the gear G. The brace is provided with a hub, i, having an oil-channel, j, formed in its interior, which coincides at every revolution with an oil-hole, k, formed through the body of the cone, and stopped by a plug, l, upon its orifice. As the outlet of the oil-channel j is in contact with the gears K and G, the oil is thoroughly distributed to them and to the studs s by the rotation of the parts when in motion.

By mounting the gears all upon the main shaft, instead of upon a back gear-shaft, as is usual in most lathes, I produce a speed-gearing entirely free from the objection which has generally prevented the use of all speed-gears upon milling-machines, drills, and many other tools—viz., the exposure of the workman to injury by the teeth of the wheels. By arranging the locking-bolts and intermediate gears in pairs upon opposite sides of the central shaft a perfect balance of the forces is secured, and all side-thrust upon the shaft and its bearings is prevented. My construction is therefore more efficient and durable than those employing an auxiliary shaft which produces such side-thrust, and the construction of my locking devices affords the utmost ease of operation when desired.

I therefore claim my invention as follows:

1. The combination, with a shaft, A, fixed bearing B, and gear G, rotated upon the shaft by cone E or its equivalent, of a flange, L, secured to the shaft, and carrying gears K, in connection with gear G, a ring-gear, H, connected with gears K and suitably mounted to revolve freely upon the shaft, and means for securing the ring-gear to the flange L or bearing B at pleasure, substantially as herein set forth.

2. The construction for the locking device, consisting of the bolts a and collar c, combined with the hub of the disk J and operating to lock the disk to the fixed bearing B or flange L at pleasure, substantially as set forth.

3. The combination, with the bolts a, hub b, and collar c, of the spring f and grooves n n, arranged and operated substantially as described.

4. The combination, with the flange L and studs n n, carrying the intermediate gears, K, of the brace M, arranged to revolve on the sleeve F, substantially as and for the purpose set forth.

5. In combination with the shaft A, cone E, and sleeve F, the speed-gearing, constructed substantially as described, and provided with the brace M and oil channels j k for distributing oil to the internal gearing, substantially in the manner set forth.

JOHN STEWART.

Witnesses:
 HORACE HARRIS,
 E. P. HAND.